United States Patent
Matsumoto

(10) Patent No.: US 8,718,504 B2
(45) Date of Patent: May 6, 2014

(54) CONVERTER AND SWITCHING POWER SUPPLY FOR TURNING ON SWITCHING UNIT ACCORDING TO DECLINE OF INPUT VOLTAGE, AND IMAGE FORMING APPARATUS INCLUDING THE SWITCHING POWER SUPPLY

(75) Inventor: Shinichiro Matsumoto, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 12/727,782

(22) Filed: Mar. 19, 2010

(65) Prior Publication Data

US 2010/0239303 A1 Sep. 23, 2010

(30) Foreign Application Priority Data

Mar. 23, 2009 (JP) .................................. 2009-070181

(51) Int. Cl.
*G03G 15/00* (2006.01)
*G05F 1/10* (2006.01)

(52) U.S. Cl.
USPC ........................................... 399/88; 323/282

(58) Field of Classification Search
USPC ............ 399/88; 323/282, 284, 285, 234, 293, 323/298, 297
See application file for complete search history.

(56) References Cited

U.S. PATENT DOCUMENTS

2003/0205990 A1* 11/2003 Wittenbreder, Jr. ............ 323/222
2005/0068794 A1* 3/2005 Weng et al. ...................... 363/50

FOREIGN PATENT DOCUMENTS

| JP | 60-257766 A | 12/1985 |
| JP | 60-257766 A | 12/1985 |
| JP | 07-146719 A | 6/1995 |
| JP | 2001-178117 A | 6/2001 |
| JP | 2003-266878 A | 9/2003 |
| JP | 2006-067703 A | 3/2006 |
| JP | 2008-067494 A | 3/2008 |
| KR | 10-0666829 B1 | 1/2007 |

OTHER PUBLICATIONS

Machine English Translation of JP2003-266878 published on Sep. 25, 2003.*
U.S. Appl. No. 12/721,963, filed Mar. 11, 2010, Yasuhiro Nakata.
Kim, Hee-Joon, "Basic Design of Switched-Mode Power Supply," Book Media Group Sung An Dang (www.cyber.co.kr/www.sungandang.com), pp. 1-34.

* cited by examiner

*Primary Examiner* — Billy Lactaoen
(74) *Attorney, Agent, or Firm* — Canon USA, Inc. IP Division

(57) ABSTRACT

A converter includes a switching element configured to switch an input voltage, a drive unit configured to drive the switching element, a pulse signal generating unit configured to supply a pulse signal to the drive unit, and a bypass unit configured to connect the switching element and the pulse signal generating unit without involving the drive unit. An operation of the bypass unit maintains the switching element in an on state when the input voltage is switched to a lower voltage and switching of the input voltage is stopped.

11 Claims, 12 Drawing Sheets

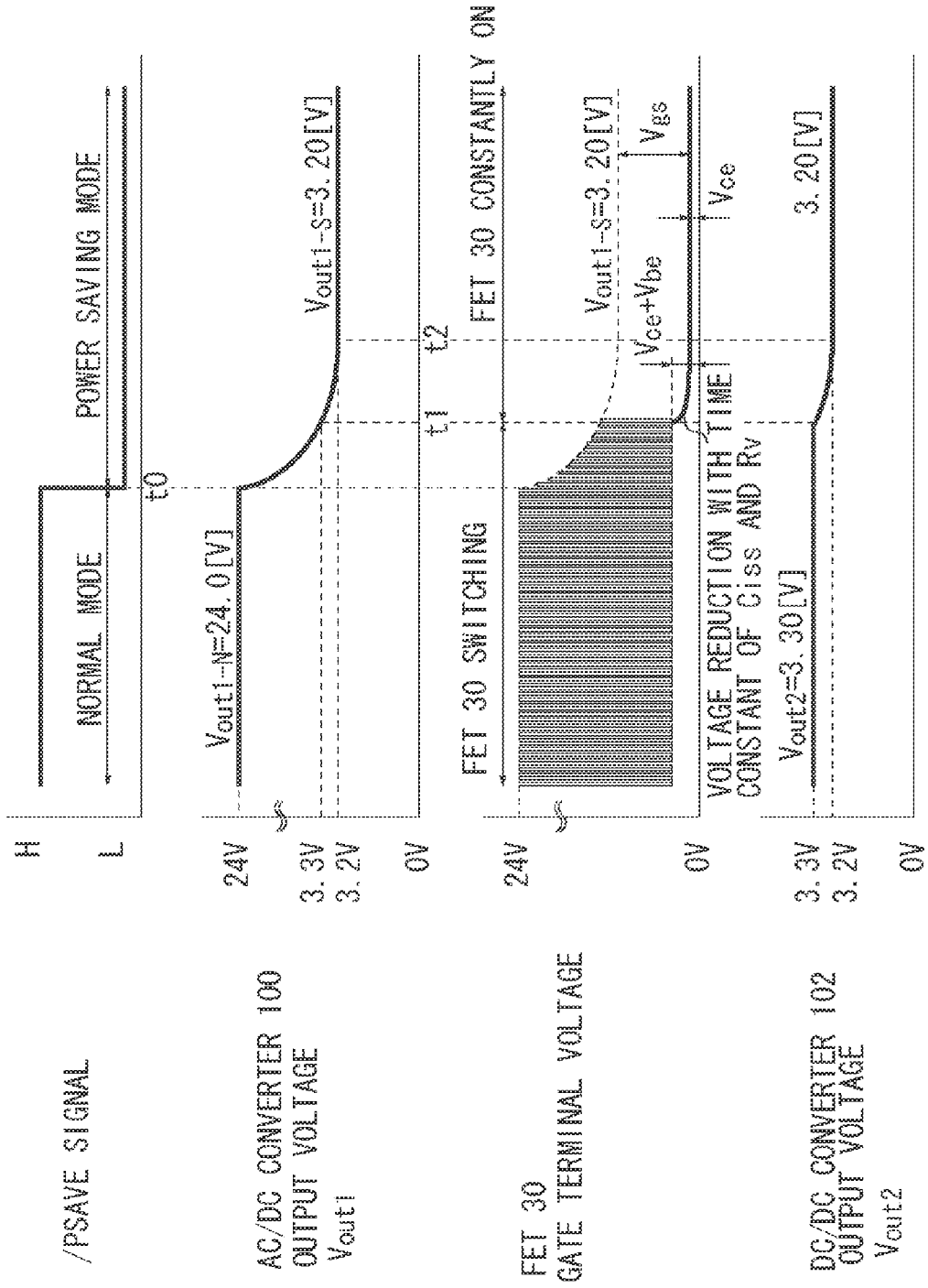

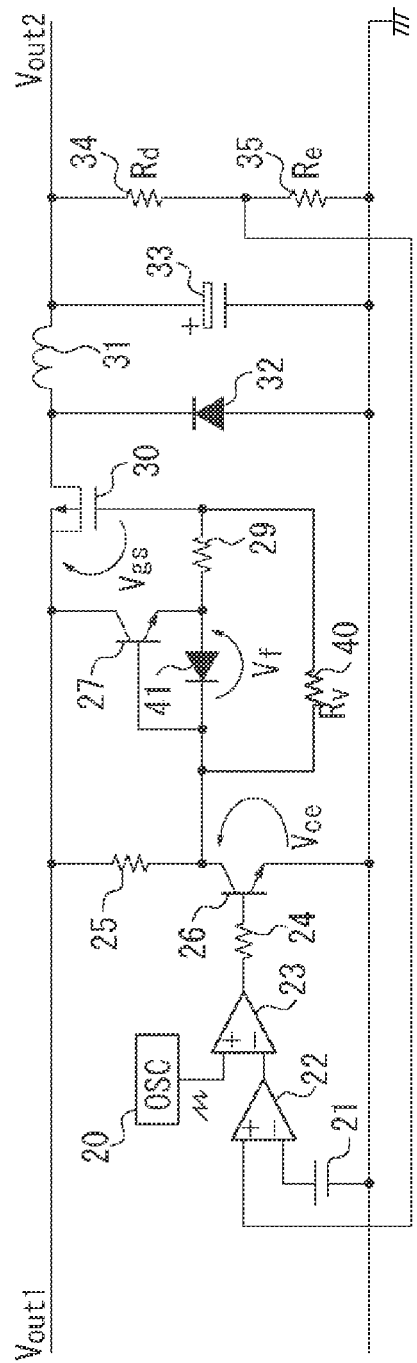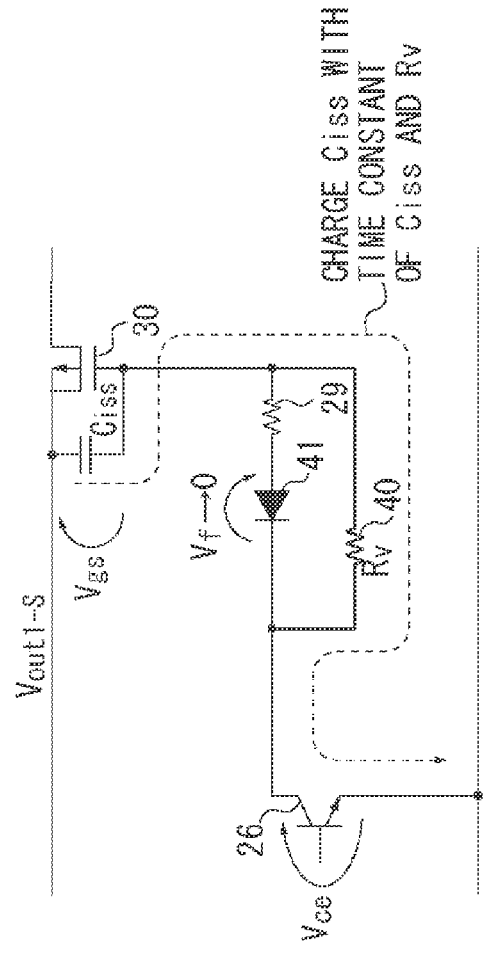
FIG. 5A
FIG. 5B

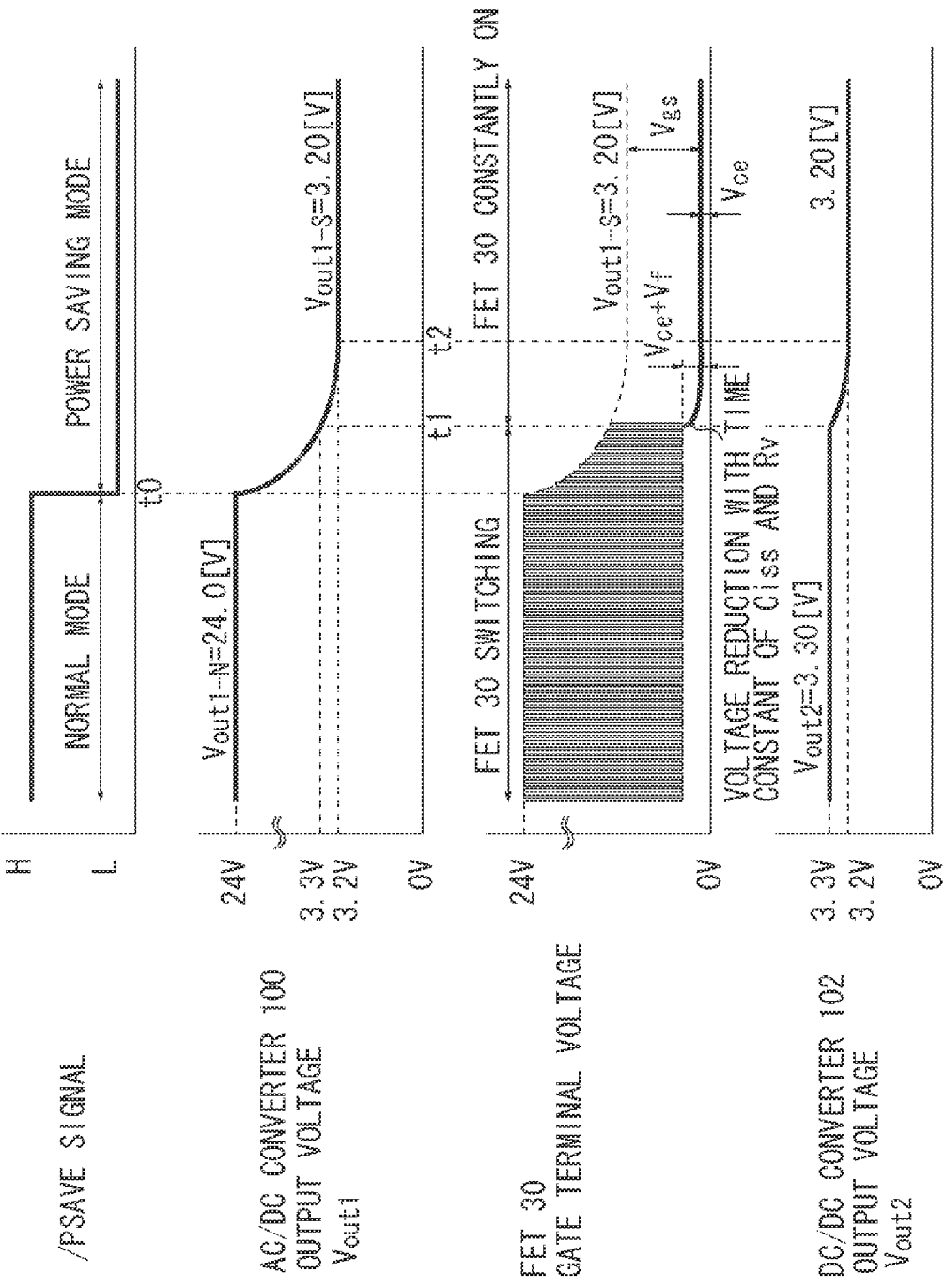

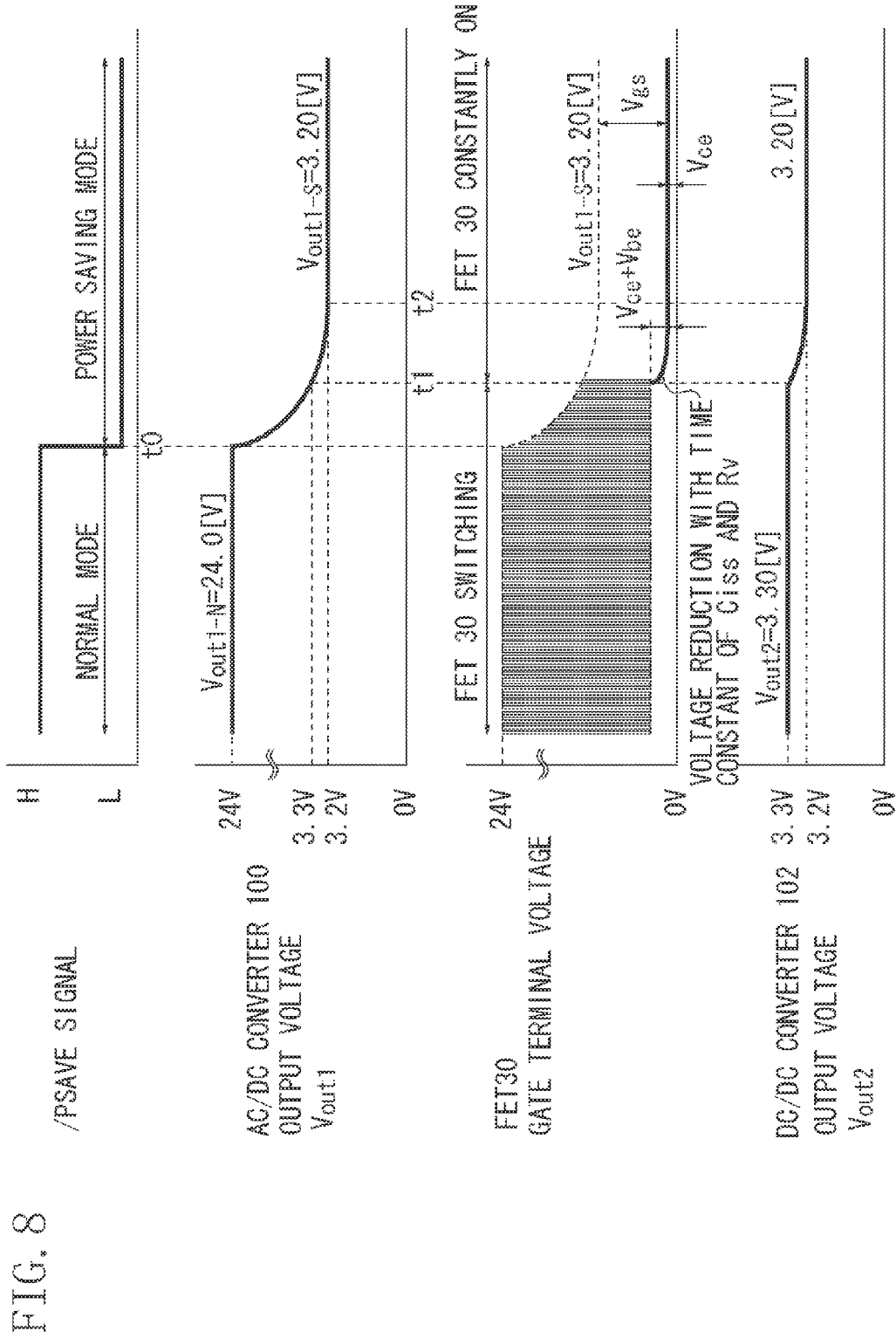

CONVERTER AND SWITCHING POWER SUPPLY FOR TURNING ON SWITCHING UNIT ACCORDING TO DECLINE OF INPUT VOLTAGE, AND IMAGE FORMING APPARATUS INCLUDING THE SWITCHING POWER SUPPLY

BACKGROUND OF THE INVENTION

1. Field of the Invention

The present invention relates to a converter configured to convert a voltage, a switching power supply including the converter, and an image forming apparatus including the switching power supply.

2. Description of the Related Art

FIG. 9 illustrates an example of a block diagram of a device that includes a typical switching power supply. In FIG. 9, an AC/DC converter 100 transforms an alternating-current voltage from a commercial power supply 1 to a direct-current voltage Vout1. The voltage Vout1 is supplied to an actuator 101 such as a motor. The voltage Vout1 is also supplied to a DC/DC converter 102. The DC/DC converter 102 transforms the voltage Vout1 to a direct-current voltage Vout2. The voltage Vout2 is supplied to a control unit 103 configured to control the device.

Generally, the power supply voltage Vout1 for the actuator 101 is set higher than the power supply voltage Vout2 for the control unit 103. For example, when the voltage Vout1 is DC 24.0 V (Vout1=DC 24.0 V), the voltage Vout2 is set to DC 3.30 V (Vout2=DC 3.30 V) or when the voltage Vout1 is DC 12.0 V (Vout1=DC 12.0 V), the voltage Vout2 is set to DC 1.80 V (Vout2=DC 1.80 V) in general. In the following explanation, an example in which the voltage Vout1 is DC 24.0 V (Vout1=DC 24.0 V) and the voltage Vout2 is DC 3.30 V (Vout2=DC 3.30 V) will be described. Here, "AC" represents an alternating-current voltage and "DC" represents a direct-current voltage.

As a typical switching power supply, a configuration of power supply including an AC/DC converter and a DC/DC converter is discussed in Japanese Patent Application Laid-Open No. 2003-266878.

In these days, further reduction of power consumption of an electronic device in the standby state has been strongly desired. In the device including a switching power supply discussed in the aforementioned Japanese Patent Application Laid-Open No. 2003-266878, a normal operation mode and a power saving mode for reducing power consumption are provided. In the power saving mode, the operating state of the switching power supply is changed to reduce standby power consumption. An operation of the switching power supply will be described below with reference to FIGS. 9 and 10.

FIG. 10 is a circuit diagram of a switching power supply including an AC/DC converter 100 for converting an alternating-current voltage from a commercial power supply into a direct-current voltage, and a DC/DC converter 102 for converting the direct-current voltage from the AC/DC converter 100 into a different direct-current voltage. Here, in the switching power supply, the AC/DC converter serves as a first converter and the DC/DC converter serves as a second converter. The output voltage of the AC/DC converter is a first voltage and the output voltage of the DC/DC converter is a second voltage. In this example, the switching power supply is discussed as a switching power supply that outputs a first voltage of 24.0 V and a second voltage of 3.30 V. Next, a basic operation of the switching power supply will be described.

First, the AC/DC converter 100 serving as a first converter will be described. The alternating-current voltage of the commercial power supply 1 is rectified and smoothed by a bridge diode 2 and a primary smoothing capacitor 3 and output as a direct-current voltage. The direct-current voltage is supplied to a field-effect transistor (FET) 9 serving as a switching element via a primary winding 10p of a transformer. To a gate terminal of the FET 9, a pulse-width modulation (PWM) circuit including a comparator 5, a triangular wave generator 4, a constant voltage source 6, a resistor 7, and a photocoupler 8p is connected. The FET 9 thus performs PWM switching based on error information of the output voltage fed back to the photocoupler 8p. When PWM switching is performed, this introduces a pulse voltage to a secondary winding 10s of the transformer. This pulse voltage is rectified and smoothed by a diode 11 and a secondary smoothing capacitor 12 and is output as a direct-current voltage Vout1. The voltage Vout1 is supplied to an error amplifier circuit including resistors 15, 16, and 13, a shunt regulator 14, and a photocoupler 8s. The FET 9 thus performs PWM switching based on the error information of the voltage Vout1. With this configuration, the voltage Vout1 is made constant.

Next, the DC/DC converter 102 serving as a second converter will be described. The output voltage Vout1 of the AC/DC converter 100 is supplied, as an input voltage to the DC/DC converter 102, to an FET 30 serving as a switching element. To a gate terminal of the FET 30, a push-pull circuit including transistors 27 and 28 is connected via a resistor 29. This push-pull circuit functions as a drive unit for driving the FET 30. The push-pull circuit is used to enhance the speed of switching by enhancing the speed of charging and discharging of a gate input charge Qg of the FET 30. To the push-pull circuit, a PWM circuit serving as a pulse signal generating unit and including resistors 25 and 24, a transistor 26, comparators 23, 22, a triangular wave generator 20, and a constant voltage source 21 is connected. This PWM circuit outputs a pulse signal (hereinafter, also referred to as a PWM signal) for switching the FET 30. The FET 30 performs PWM switching based on a PWM signal that is output based on error information of the output voltage fed back to the comparator 22. With this structure, the pulse voltage is supplied to an inductor 31 and a diode 32. This pulse voltage is commutated by the inductor 31, the diode 32, and an electrolytic capacitor 33 and output as an output voltage Vout2. The output voltage Vout2 is divided by resistors 34 and 35 and supplied to the comparator 22. Thus, as described above, the FET 30 performs PWM switching based on the error information of the voltage Vout2. With this configuration, the voltage Vout2 is made constant. Here, the above-described PWM signal is a pulse width modulation signal and "PWM switching" refers to a switching operation of the FET according to a time width of the pulse width modulation signal.

In FIG. 9, a power saving signal (hereinafter, referred to as a /PSAVE signal) is supplied from the control unit 103 to the AC/DC converter 100. When shifting to the power saving mode is instructed by a /PSAVE signal from the control unit 103, the output voltage of the AC/DC converter 100 is reduced. Then, the operating state is switched to the power saving mode to realize reduction of power consumption while the FET 30 of the DC/DC converter 102 is kept in an on state constantly.

Here, when a general element is used as the FET 30, an ON threshold voltage to keep the general FET constantly in an on state is often equal to or greater than 2.5 V, for example. When such an element is used, for example, if a gate terminal voltage of the FET is lower than 2.5 V in the power saving mode, a case where the FET cannot certainly be turned on may occur in the switching power supply illustrated in FIG. 9. Regardless of FETs, when a power supply circuit includes general elements or parts, the ON threshold voltage becomes lower than 2.5 V. To solve this issue, an element that has a low ON threshold voltage can be used. However, an FET having a low ON threshold voltage may be expensive since a finer semiconductor process is to be used to manufacture such an FET to improve the sensitivity of its gate terminal.

Further, when an expensive FET having a low ON threshold voltage is used, a withstand voltage between its drain and source tends to be low since such an FET is manufactured in a fine process. However, in the above-described switching power supply, the output voltage of the AC/DC converter in a normal mode becomes high so that a high drain-source withstand voltage of an FET is to be used. Thus, such an expensive FET having a low ON threshold voltage does not have a sufficient drain-source withstand voltage.

SUMMARY OF THE INVENTION

According to an aspect of the present invention, a converter includes a switching element configured to switch an input voltage, a drive unit configured to drive the switching element, a pulse signal generating unit configured to supply a pulse signal to the drive unit, and a bypass unit configured to connect the switching element and the pulse signal generating unit without involving the drive unit. An operation of the bypass unit maintains the switching element in an on state when the input voltage is switched to a lower voltage and switching of the input voltage is stopped.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating an operating state of the switching power supply according to the first exemplary embodiment.

FIGS. 5A and 5B are circuit block diagrams of a switching power supply according to a second exemplary embodiment of the present invention.

FIG. 6 is a diagram illustrating an operating state of the switching power supply according to the second exemplary embodiment.

FIG. 8 is a diagram illustrating an operating state of the switching power supply according to the third exemplary embodiment.

DESCRIPTION OF THE EMBODIMENTS

Various exemplary embodiments, features, and aspects of the invention will be described in detail below with reference to the drawings.

Prior to describing a configuration of an exemplary embodiment of the present invention, an issue in a background configuration of the present invention will be described with reference to FIGS. 9, 10, 11, and 12.

Figure 10:
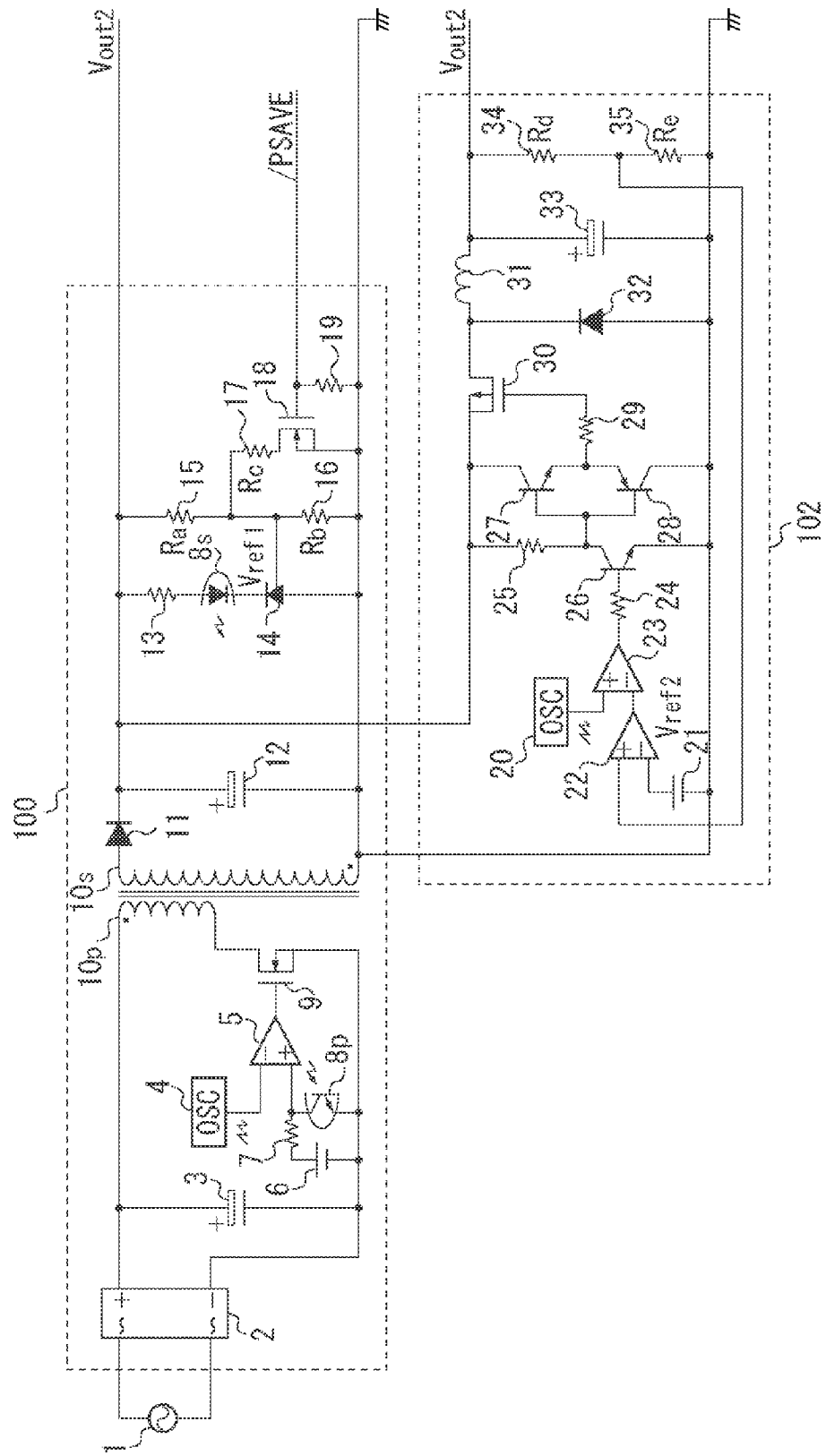
FIG. 10 is a circuit block diagram of a switching power supply.

As described above, in FIG. 9, when a power saving signal (/PSAVE signal) is supplied from the control unit 103 to the AC/DC converter 100, the switching power supply illustrated in FIG. 10 shifts to a power saving mode.

Hereinafter, an operation in the power saving mode will be described with reference to FIG. 10. The control unit 103 supplies a /PSAVE signal of high (H) level to set the device in a normal mode or a /PSAVE signal of low (L) level to set the device in a power saving mode. Here, the /PSAVE signal is supplied to an FET 18 in the error amplifier circuit of the AC/DC converter 100. In the normal mode, that is, when the /PSAVE signal is in H level, the FET 18 is turned on and the resistor 16 and the resistor 17 are connected in parallel. The output voltage Vout1 is divided by the resistor 15 and the parallel resistors (resistor 16//resistor 17) and the divided voltage is supplied to a reference terminal of the shunt regulator 14. Thus, when respective resistance values of the resistors 15, 16, and 17 are represented by "Ra", "Rb", and "Rc", and a reference voltage of the shunt regulator 14 is represented by "Vref1", an output voltage Vout1-N in the normal mode is approximately expressed by Equation (1).

$$V_{out1-N} \cong \frac{R_a + (R_b // R_c)}{(R_b // R_c)} \cdot V_{ref1} \quad (1)$$

Here, "(Rb//Rc)" is a parallel resistance value of Rb and Rc and expressed by Equation (2).

$$R_b // R_c = \frac{R_b \cdot R_c}{R_b + R_c} \quad (2)$$

On the other hand, in the power saving mode, that is, when the /PSAVE signal is in L level, the FET 18 is turned off and the resistor 17 is disconnected. Here, the voltage supplied to the reference terminal of the shunt regulator 14 is a voltage obtained by dividing the Vout1 by the resistor 15 and the resistor 16. Thus, an output voltage Vout1-S in the power saving mode is approximately expressed by Equation (3).

$$V_{out1-S} \cong \frac{R_a + R_b}{R_b} \cdot V_{ref1} \quad (3)$$

Therefore, the output voltage Vout1-S in the power saving mode becomes lower than the output voltage Vout1-N in the normal mode.

The output voltage Vout2 of the DC/DC converter 102 can be obtained in the same manner.

The voltage obtained by dividing the voltage Vout2 by the resistor 34 and the resistor 35 is supplied to the comparator 22 in the error amplifier circuit and compared with the voltage of the constant voltage source 21. Thus, when respective resistance values of the resistors 34 and 35 are represented by "Rd" and "Re", and the voltage of the constant voltage source 21 is represented by "Vref2", the output voltage Vout2 is approximately expressed by Equation (4).

$$V_{out2} \cong \frac{R_d + R_e}{R_e} \cdot V_{ref2} \qquad (4)$$

Using the above equations, the resistance values Ra, Rb, Rc, Rd, and Re are set so that the output voltages of the AC/DC converter 100 and the DC/DC converter 102 are set as expressed by the following equations.

Here, the output voltage Vout1-S of the AC/DC converter 100 in the power saving mode is set slightly lower than the output voltage Vout2 of the DC/DC converter 102. In this example, it is assumed that the voltage Vout1-S is 3.20 V (Vout1-S=3.20 V) while the voltage Vout2 is 3.30 V (Vout2=3.30 V). However, this is one of examples and the set value of the output voltage Vout1-S can be selected as appropriate within a range of operation power supply voltages of the control unit 103.

$$V_{out1-N} \cong \frac{R_a + (R_b // R_c)}{(R_b // R_c)} \cdot V_{ref1} = 24.0 \ [V] \qquad (5)$$

$$V_{out1-S} \cong \frac{R_a + R_b}{R_b} \cdot V_{ref1} = 3.20 \ [V] \qquad (6)$$

$$V_{out2} \cong \frac{R_d + R_e}{R_e} \cdot V_{ref2} = 3.30 \ [V] \qquad (7)$$

Based on the above settings, an operation for switching from the normal mode to the power saving mode will be described with reference to FIG. 11.

Figure 11:
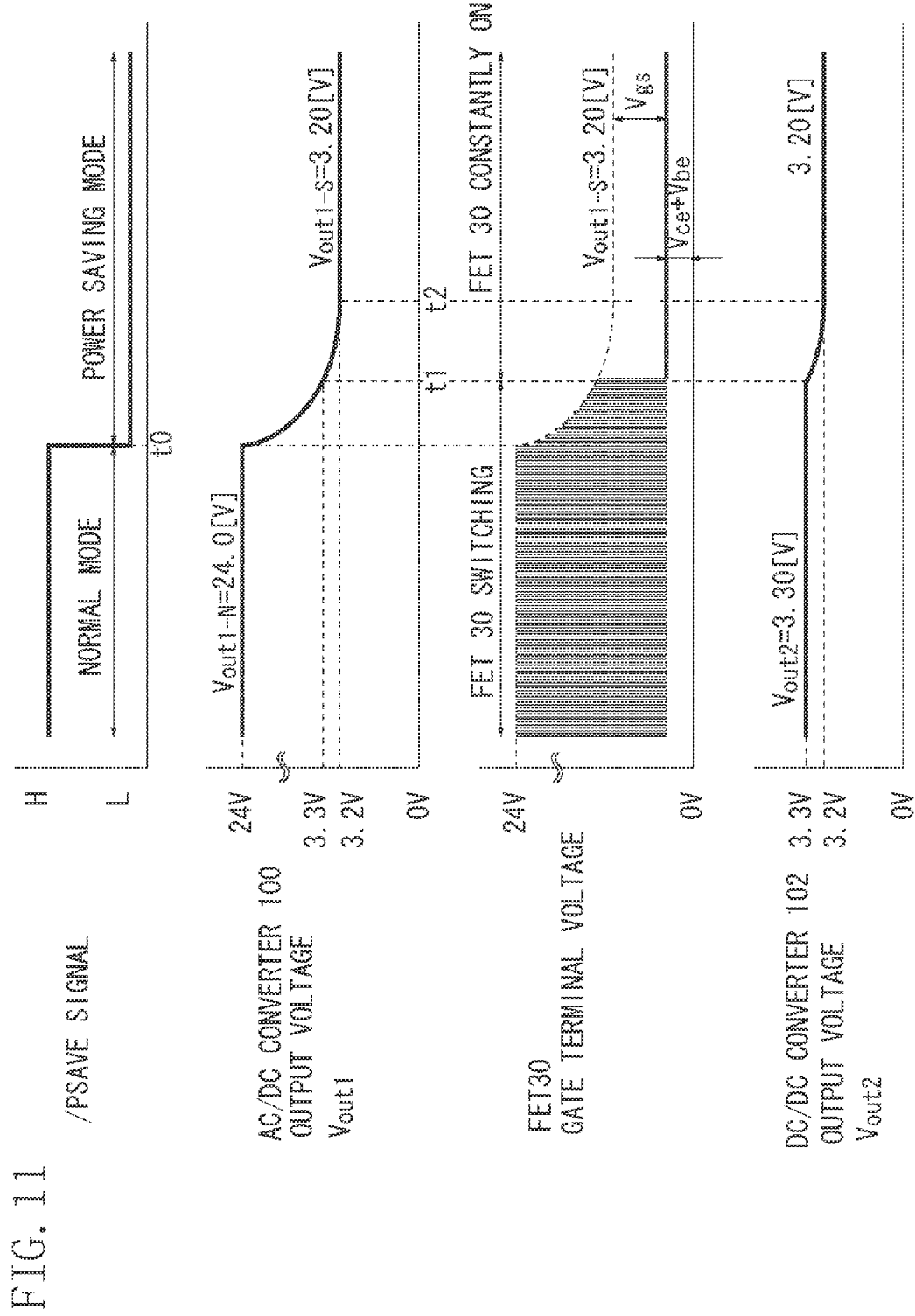
FIG. 11 is a diagram illustrating an operating state of a switching power supply.

In FIG. 11, before time t0, the control unit 103 sets the device in the normal mode by supplying a /PSAVE signal of H level. Thus, the output voltage Vout1-N of the AC/DC converter 100 is 24.0V (Vout1-N=24.0 V) and the output voltage Vout2 of the DC/DC converter 102 is 3.30 V (Vout2=3.30 V). A PWM pulse is supplied to the gate terminal of the FET 30 and the FET 30 performs a switching operation according to the PWM pulse. At time t0, the control unit 103 supplies a /PSAVE signal of L level to shift the mode of the device to the power saving mode. Then, the output voltage Vout1 of the AC/DC converter 100 starts to be lowered and becomes 3.20 V after time t2.

In this process, the description will focus on the operation of the DC/DC converter 102. In a range where the output voltage of the AC/DC converter 100 is equal to or greater than 3.30 V, a PWM pulse is supplied to the gate terminal of the FET 30 and the FET 30 performs switching. With this configuration, the output voltage of the DC/DC converter 102 is made constant at 3.30 V. After time t1, when the output voltage of the AC/DC converter 100 becomes lower than 3.30 V, the output voltage of the DC/DC converter 102 cannot be kept at 3.30 V, which is a control target, so that the FET 30 is kept in an on state constantly. In other words, the FET 30 does not perform switching and stays in a conductive state in which the on state is maintained. With this structure, the output voltage of the DC/DC converter 102 becomes approximately equal to the output voltage of the AC/DC converter 100 and becomes 3.20 V after time t2.

As described above, in the power saving mode, the output voltage of the AC/DC converter 100 is made equal to or lower than the control target voltage of the DC/DC converter 102 to keep the FET 30 of the DC/DC converter 102 in an on state constantly. Thereby, the following effect for reducing power consumption can be obtained. First, when the output voltage Vout1 of the AC/DC converter 100 is made lower, power consumption in the actuator 101 is reduced. Further, when the switching by the FET 30 stops, switching loss is prevented.

The configuration that is capable of reducing the output voltage of the AC/DC converter 100 and keeping the FET 30 of the DC/DC converter 102 in an on state constantly in such a power saving mode has the following issue.

As illustrated by waveforms of the gate terminal voltage of the FET 30 in FIG. 11, when the FET 30 is constantly in an on state, a gate-to-source voltage Vgs of the FET 30 becomes lower than the output voltage Vout1-S of the AC/DC converter 100 by an amount of Vce+Vbe.

Figure 12:
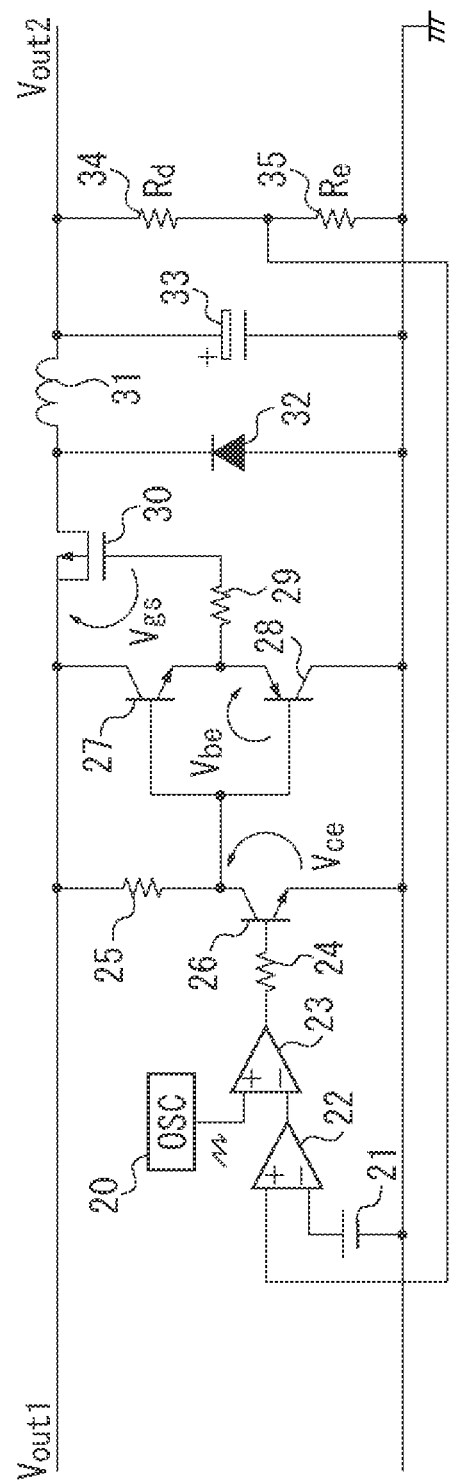
FIG. 12 is a circuit block diagram of a switching power supply.

As illustrated in FIG. 12, "Vce" is an emitter-to-collector voltage of the transistor 26 and "Vbe" is a base-to-emitter voltage of the transistor 28. Moreover, Vgs is approximately expressed by Equation (8).

$$V_{gs} \cong V_{out1-S} - (V_{ce} + V_{be}) \qquad (8)$$

In the above-described example, the voltage Vout1-S is 3.20 V (Vout1-S=3.20 V). Further, in a general transistor, the voltage Vce is approximately 0.4 V (Vce=0.4 V) and the voltage Vbe is approximately 0.4 V (Vbe=0.7 V), so that it can be expressed as Vgs=3.20 V−(0.4 V+0.7 V)=2.1 V. Then, the FET having the ON threshold voltage Vgs-on is generally an element having a voltage of 4.0 V or at least equal to or greater than 2.5 V. In this example in which the voltage Vgs is 2.1 V (Vgs=2.1 V), when an FET having the voltage Vgs-on of 2.5 V is used, the FET cannot reliably be turned on. To reliably turn on the FET, an FET having a lower ON threshold voltage or an FET having an ON threshold voltage Vgs-on of 1.5 V can be used, for example. However, an FET having a low ON threshold voltage is expensive since such an FET is manufactured in a finer semiconductor process to improve its gate sensitivity. Thus, it is difficult to reliably turn on the FET with an inexpensive circuit configuration.

Further, an FET having a lower ON threshold voltage tends to have a lower drain-source withstand voltage Vdss since such an FET is made in a fine process. However, in this example, since the output voltage Vout1-N of the AC/DC converter becomes high in the normal mode, an FET 30 having a high drain-source withstand voltage Vdss is to be used. Thus, when an FET having a low ON threshold voltage is used, the voltage Vdss is not sufficient. Specifically, in the assumed example, since the voltage Vout1-N is 24.0 V (Vout1-N=24.0V), an FET having the voltage Vdss of 30 V or 40 V is to be used. However, in general, an FET having an ON threshold voltage Vgs-on of 1.5 V is not applicable since the voltage Vdss is approximately 10 V to 20 V.

Next, to solve the above issue, an example configuration of an exemplary embodiment of the present invention will be described based on the following exemplary embodiments.

First, a first exemplary embodiment of the present invention will be described. Here, the same reference numerals are used to designate the configurations which are similar to those in the above example, and descriptions thereof will not be repeated.

Figures 1A, 1B:
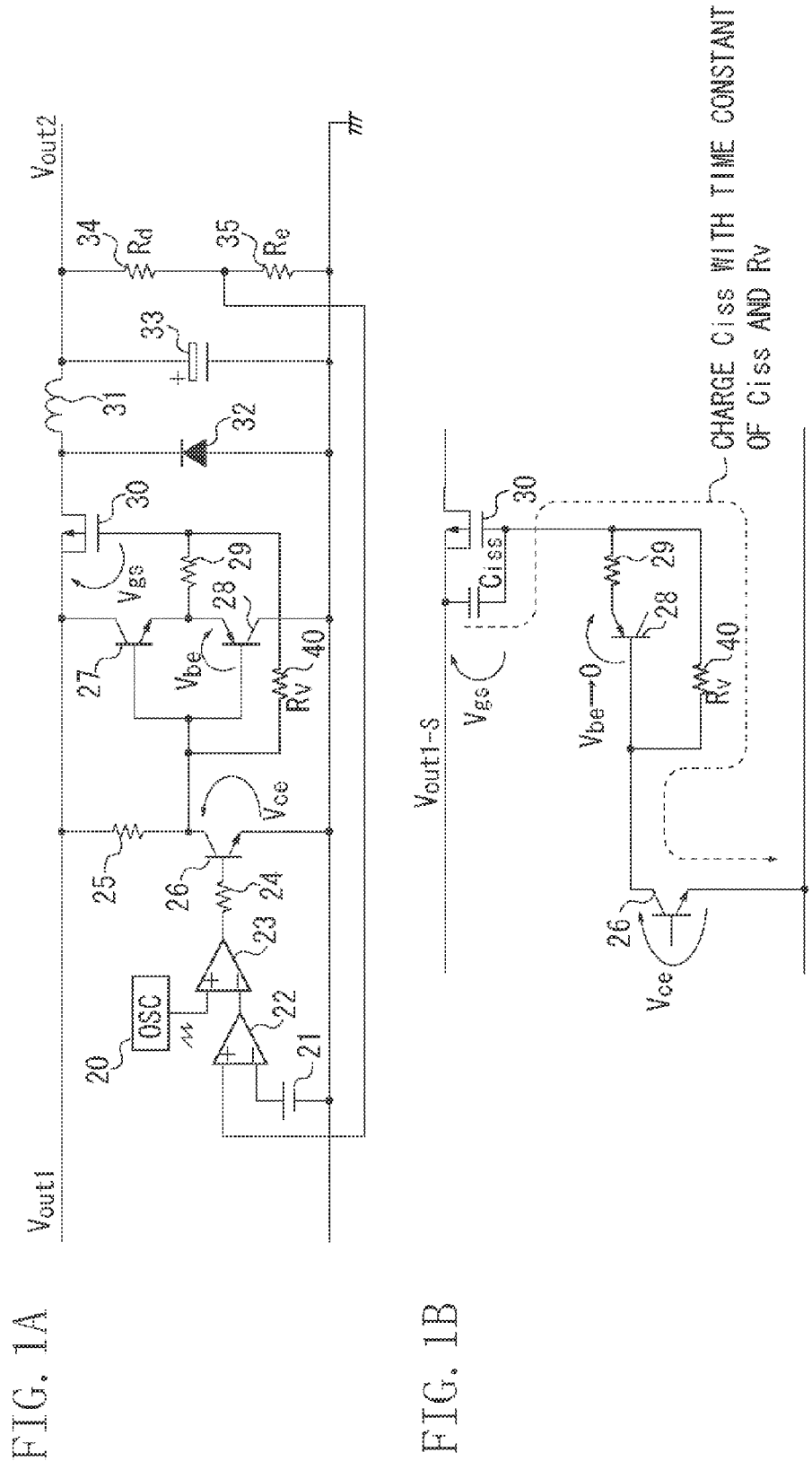
FIGS. 1A and 1B are circuit block diagrams of a switching power supply according to a first exemplary embodiment of the present invention.

FIG. 1A illustrates a circuit configuration of a DC/DC converter according to the first exemplary embodiment. The present exemplary embodiment has a configuration in which a bypass resistor 40 is provided between the gate terminal of the FET 30 and a collector terminal of the transistor 26 in addition to the above-described DC/DC converter 102 in FIG. 10. The bypass resistor 40 serves as a bypass unit configured to charge an input capacitance of the FET.

In the configuration of the present exemplary embodiment, when the output voltage of the AC/DC converter 100 is lowered and the FET 30 of the DC/DC converter 102 is kept in an on state constantly during the power saving mode, as illustrated by the waveforms of the gate terminal voltage of the FET 30 in FIG. 2, the gate-to-source voltage Vgs of the FET 30 becomes smaller than the output voltage Vout1-S of the AC/DC converter 100 by an amount of Vce+Vbe at time t1. As illustrated in FIG. 1A, "Vce" represents an emitter-to-collector voltage of the transistor 26 and "Vbe" represents a base-to-emitter voltage of the transistor 28. Thus, the voltage "Vgs" is approximately expressed in Equation (9).

$$V_{gs} \cong V_{out1-S} - (V_{ce} + V_{be}) \tag{9}$$

After that, as illustrated in FIG. 1B, the input capacitance of the FET 30 is to be charged via the bypass resistor 40. When the input capacitance of the FET 30 is represented by "Ciss" and the resistance value of the bypass resistor 40 is represented by "Rv," the input capacitance of the FET 30 is charged with the time constant of Ciss and Rv, and the base-to-emitter voltage Vbe of the transistor 28 becomes approximately 0. Thus, the gate-to-source voltage of the FET 30 is expressed by Equation (10).

$$V_{gs} \cong V_{out1-S} - V_{ce} \tag{10}$$

As described above, when the bypass resistor 40 is added between the gate terminal of the FET 30 and the collector terminal of the transistor 26, the voltage applied between the base and emitter of the transistor 28 can be made approximately 0 V, so that the gate-to-source voltage of the FET 30 can be increased. In the above example, the voltage Vout1-S is 3.20 V. Further, since a typical transistor has the voltage Vce of about 0.4 V, it can be expressed as Vgs=3.20 V−0.4 V=2.8 V. The ON threshold voltage Vgs-on of the FET is generally 4.0 V or 2.5 V. In this example in which the voltage Vgs is 2.8 V (Vgs=2.8 V), when an FET having the voltage Vgs-on of 2.5 V is used, the FET can be reliably turned on.

Figure 3A:
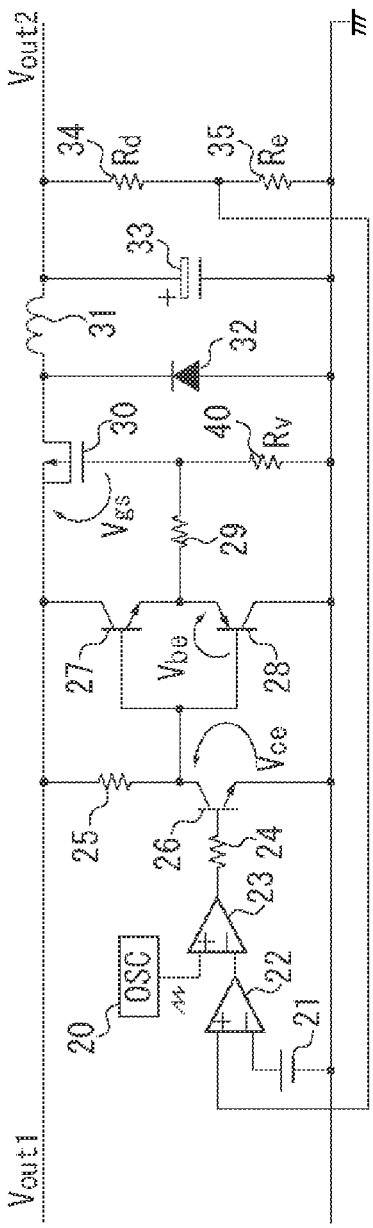
FIGS. 3A to 3C are diagrams illustrating modifications of the circuit configuration of the switching power supply according to the first exemplary embodiment.

As illustrated in FIG. 3A, a similar effect can be obtained by adding the bypass resistor 40 between the gate terminal of the FET 30 and the ground (GND) terminal. As illustrated by the waveforms of the gate terminal voltage of the FET 30 in FIG. 4, the gate-to-source voltage Vgs of the FET 30 becomes lower than the output voltage Vout1-S of the AC/DC converter 100 by an amount of Vce+Vbe at time t1. As illustrated in FIG. 3A, "Vce" represents the emitter-to-collector voltage of the transistor 26 and "Vbe" represents the base-to-emitter voltage of the transistor 28. Thus, the voltage Vgs is expressed approximately by Equation (11)

$$V_{gs} \cong V_{out1-S} - (V_{ce} + V_{be}) \tag{11}$$

Figure 3C:
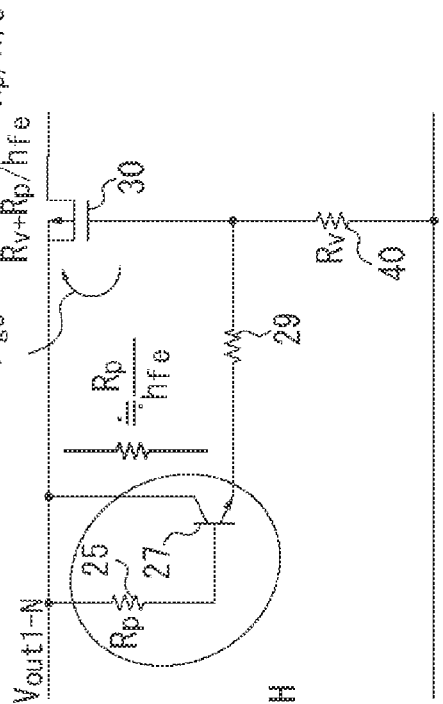
Figure 3B:
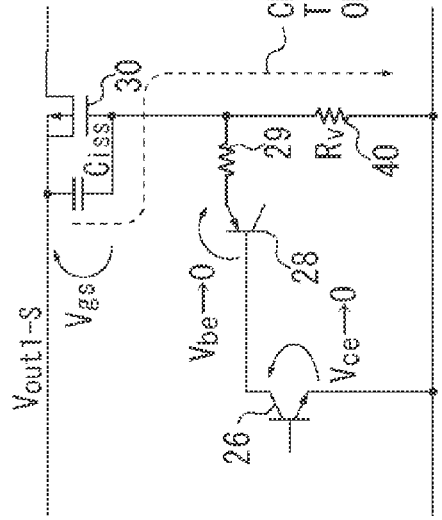

After that, as illustrated in FIG. 3B, the input capacitance of the FET 30 is to be charged via the bypass resistor 40. When the input capacitance of the FET 30 is represented by "Ciss" and the resistance value of the bypass resistor 40 is represented by "Rv," the input capacitance of the FET 30 is charged with the time constant of Ciss and Rv, and the emitter-to-collector voltage Vce of the transistor 26 and the base-to-emitter voltage Vbe of the transistor 28 become approximately 0 V. Thus, the gate-to-source voltage of the FET 30 is expressed by Equation (12).

$$V_{gs} \cong V_{out1-S} \tag{12}$$

As described above, when the bypass resistor 40 is added between the gate terminal of the FET 30 and the GND terminal, the gate-to-source voltage of the FET 30 can be increased. However, when the bypass resistor 40 is added between the gate terminal of the FET 30 and the GND terminal, care should be taken about the following points.

Figure 4:
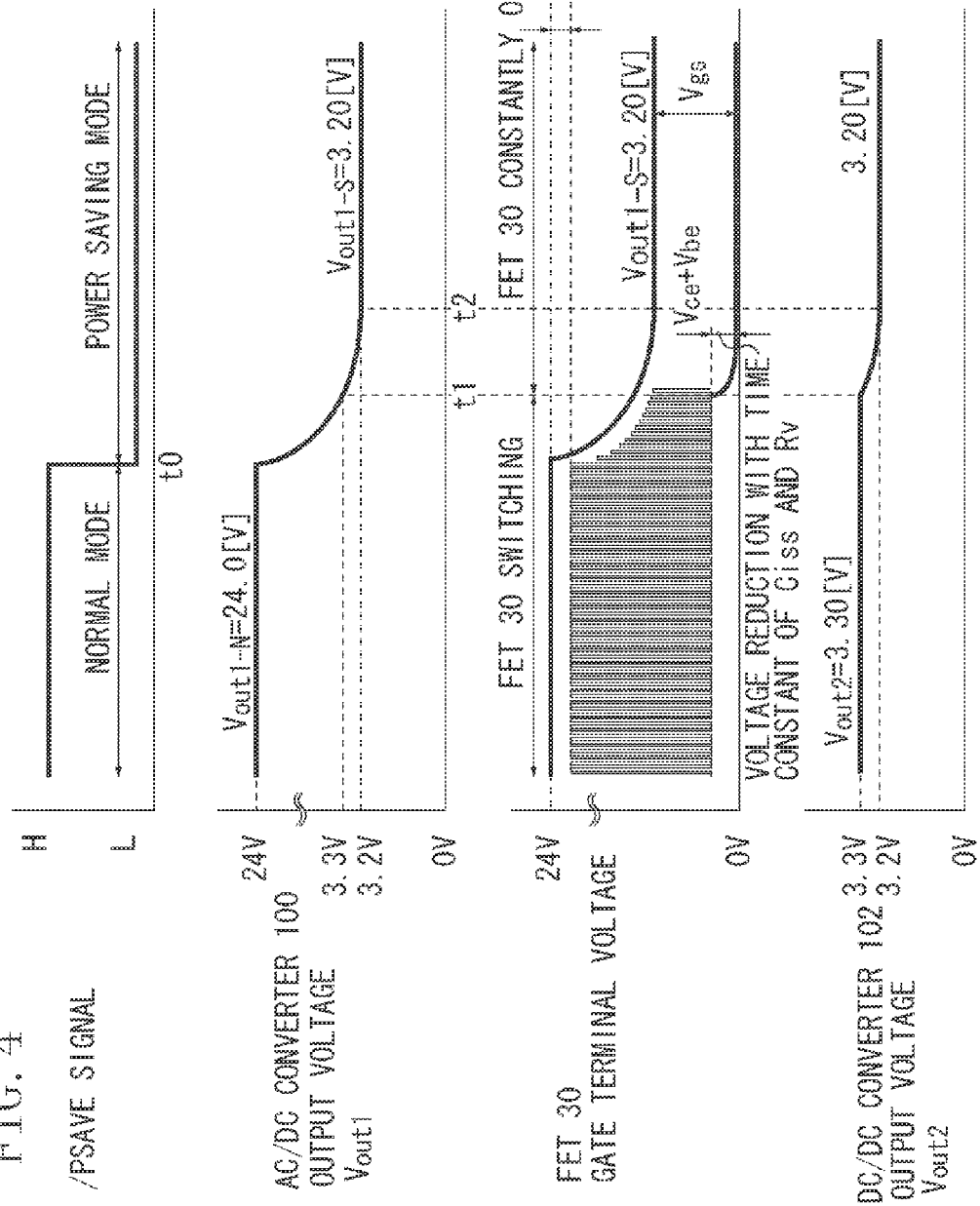
FIG. 4 is a diagram illustrating an operating state of the switching power supply according to the first exemplary embodiment.

As illustrated in FIG. 3C, the resistor 25 and the transistor 27 are apparently equivalent to the resistance represented by resistance value "Rp/hfe." Here, "Rp" represents a resistance value of the resistor 25 and "hfe" represents a current amplification rate of the transistor 27. Thus, as illustrated in FIG. 4, when the FET 30 is turned off in the normal mode, the voltage expressed by Equation (13) as the gate-to-source voltage Vgs' of the FET 30 may remain. However, the resistance value of the resistor 29 is assumed to be sufficiently smaller than Rv and Rp/hfe.

$$V'_{gs} \cong \frac{V_{out1-N}}{R_V + R_P/h_{fe}} \cdot R_P/h_{fe} \tag{13}$$

Thus, when the voltage Vgs' in Equation (13) becomes greater than an OFF threshold voltage Vgs-off of the FET 30, it is not allowed to turn off the FET 30. Thus, care should be taken to set the resistance values Rv and Rp. In other words, the values Rv and Rp are to be set based on Equation (13), so that the voltage Vgs' becomes lower than the voltage Vgs-off (Vgs'<Vgs-off). Here, in the example illustrated in FIG. 1A, the FET 30 can be reliably turned off without considering the residual voltage since the voltage Vgs of the FET 30 does not remain.

Thus, with an inexpensive circuit configuration using a universal element, the FET can be reliably turned on in the power saving mode.

Next, a second exemplary embodiment of the present invention will be described. Here, the same reference numerals are used to designate the configurations which are similar to those in the above example, and descriptions thereof will not be repeated.

FIG. 5A illustrates a circuit configuration according to the second exemplary embodiment. This circuit configuration represents a circuit in which a diode 41 is provided as a substitute for the transistor 28 in the DC/DC converter in FIG. 1A in the first exemplary embodiment. In a push-pull circuit, an NPN transistor 27 enhances the speed to turn off the FET 30 and a PNP transistor 26 enhances the speed to turn on the FET 30. When the speed to turn on the FET 30 is not enhanced, the transistor 28 in FIG. 1A can be replaced with the diode 41 as illustrated in FIG. 5A according to the present exemplary embodiment.

According to the configuration of the present exemplary embodiment, when the output voltage of the AC/DC converter 100 is lowered and the FET 30 of the DC/DC converter 102 is kept in an on state constantly during the power saving mode, as illustrated by the waveforms of the gate terminal voltage of the FET 30 in FIG. 6, the gate-to-source voltage Vgs of the FET 30 becomes lower than the output voltage Vout1-S of the AC/DC converter 100 by an amount of Vce+Vf at time t1.

As illustrated in FIG. 5A, "Vce" represents the emitter-to-collector voltage of the transistor 26 and "Vf" represents a forward voltage of the diode 41. Thus, the voltage Vgs can be expressed approximately by Equation (14).

$$V_{gs} \cong V_{out1-S} - (V_{ce} + V_f) \tag{14}$$

After that, as illustrated in FIG. 5B, the input capacitance of the FET 30 is to be charged via the bypass resistor 40. When the input capacitance of the FET 30 is represented by "Ciss" and the resistance value of the bypass resistor 40 is represented by "Rv," the input capacitance of the FET 30 is charged with the time constant of Ciss and Rv, and the forward voltage Vf of the diode 41 becomes approximately 0.

Thus, the gate-to-source voltage of the FET 30 is expressed by Equation (15).

$$V_{gs} \cong V_{out1-S} - V_{ce} \quad (15)$$

As described above, since the bypass resistor 40 is added between the gate terminal of the FET 30 and the collector terminal of the transistor 26, the voltage applied between the anode and the cathode of the diode 41 can be made approximately 0 V and the gate-to-source voltage of the FET 30 can be increased.

In the above-described configuration, the voltage Vout1-S is 3.20 V. Further, since a general transistor has the voltage Vce of about 0.4 V, it can be expressed as Vgs=3.20 V−0.4 V=2.8 V. The ON threshold voltage Vgs-on of the FET is generally 4.0 V or 2.5 V. In this example in which the voltage Vgs is 2.8V (Vgs=2.8 V), when the FET having the voltage Vgs-on or 2.5 V is used, the FET can be reliably turned on.

Thus, the FET can be reliably turned on during the power saving mode with an inexpensive circuit configuration including a universal element.

Next, a third exemplary embodiment of the present invention will be described. Here, the same reference numerals are used to designate the configurations which are similar to those in the above example and descriptions thereof will not be repeated.

Figure 7A:
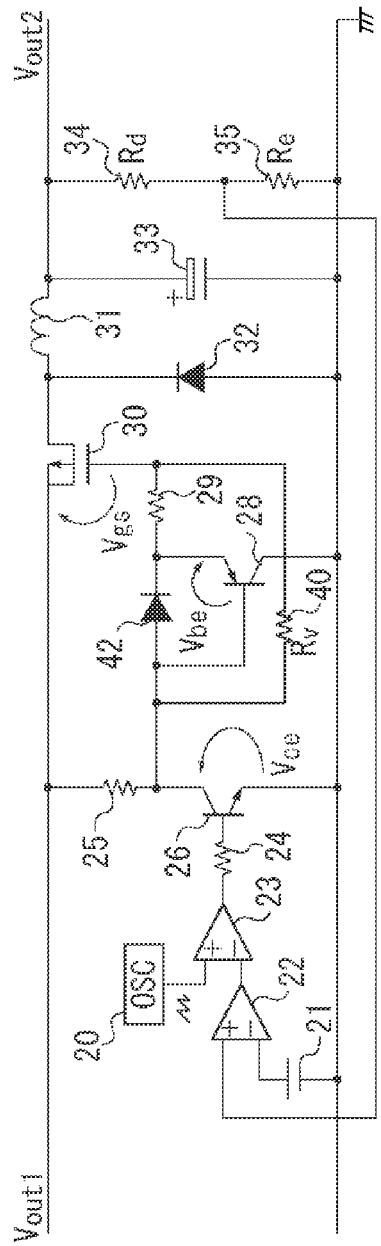
FIGS. 7A and 7B are circuit block diagrams of a switching power supply according to a third exemplary embodiment of the present invention.

FIG. 7A illustrates a circuit configuration of the present exemplary embodiment. This circuit configuration includes a diode 42 as a substitute for the transistor 27 in the DC/DC converter in the first exemplary embodiment illustrated in FIG. 1A. In the push-pull circuit illustrated in FIG. 1A, the NPN transistor 27 enhances the speed to turn off the FET 30 and the PNP transistor 28 enhances the speed to turn on the FET 30. When the speed to turn off the FET 30 is not enhanced, the transistor 27 in FIG. 1A may be replaced with the diode 42 as illustrated in FIG. 7A.

In the configuration of the present exemplary embodiment, when the output voltage of the AC/DC converter 100 is lowered and the FET 30 of the DC/DC converter 102 is kept constantly in an on state during the power saving mode, as illustrated by the waveforms of the gate terminal voltage of the FET 30 in FIG. 8, the gate-to-source voltage Vgs of the FET 30 is lower than the output voltage Vout1-S of the AC/DC converter by an amount of Vce+Vbe at time t1. As illustrated in FIG. 7A, "Vce" represents an emitter-to-collector voltage of the transistor 26 and "Vbe" represents a base-to-emitter voltage of the transistor 28. Thus, the voltage Vgs can be expressed approximately by Equation (16).

$$V_{gs} \cong V_{out1-S} - (V_{ce} + V_{be}) \quad (16)$$

Figure 7B:
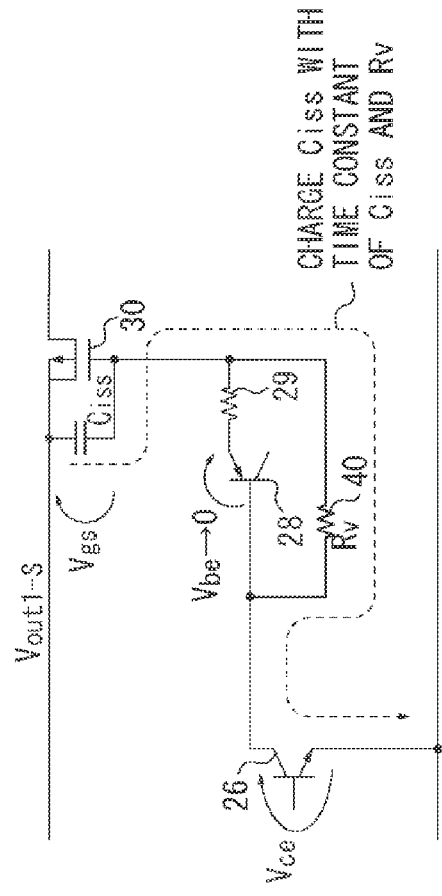
Figure 9:
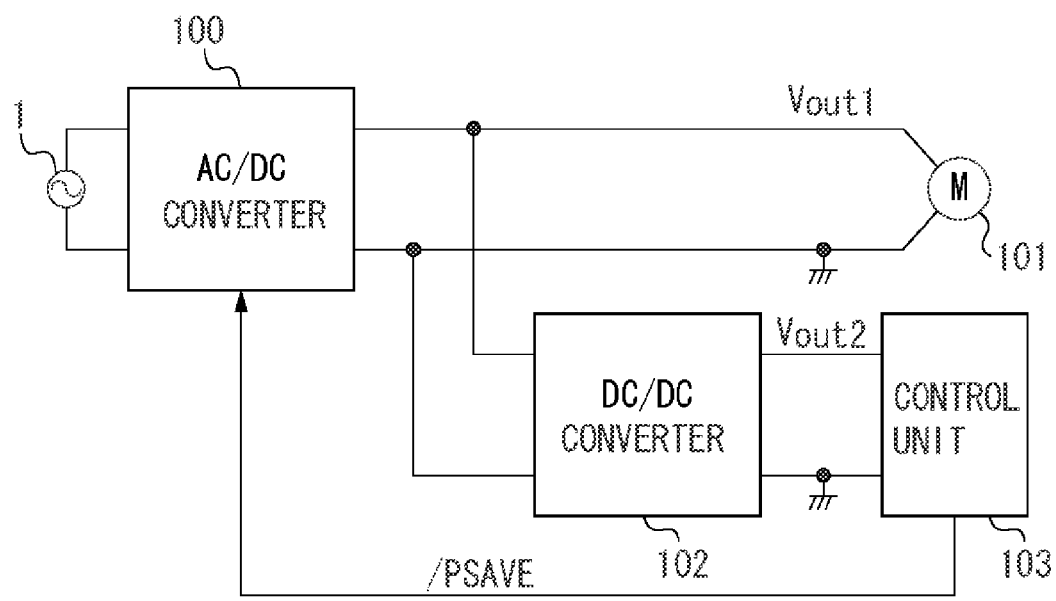
FIG. 9 is a block diagram of a switching power supply.

After that, as illustrated in FIG. 7B, the input capacitance of the FET 30 is to be charged via the bypass resistor 40. When the input capacitance of the FET 30 is represented by "Ciss" and the resistance value of the bypass resistor 40 is represented by "Rv," the input capacitance of the FET 30 is charged with the time constant of Ciss and Rv, and the base-to-emitter voltage Vbe of the transistor 28 becomes approximately 0. Thus, the gate-to-source voltage Vgs of the FET 30 is expressed by Equation (17).

$$V_{gs} \cong V_{out1-S} - V_{ce} \quad (17)$$

As described above, when the bypass resistor 40 is added between the gate terminal of the FET 30 and the collector terminal of the transistor 26, the voltage applied between the base and emitter of the transistor 28 can be made approximately 0 and the gate-to-source voltage of the FET 30 is gained.

In the example described in the description of the related art, the voltage Vout1-S is 3.20 V. Further, since a general transistor has the voltage Vce of 0.4 V, it can be expressed as Vgs=3.20 V−0.4 V=2.8 V. The ON threshold voltage Vgs-on of the FET is generally 4.0V or 2.5V. In this example in which the voltage Vgs is 2.8 V (Vgs=2.8 V), when an FET having the voltage Vgs-on of 2.5 V is used, the FET can reliably be turned on.

The switching power supply having the DC/DC converter described in the above first to third exemplary embodiments can be applied to an image forming apparatus that forms an image on a recording material, for example. Examples of the image forming apparatus include a copying machine, which copies an original document, and a printer, such as a laser-beam printer or an inkjet printer, which operates in response to instructions from a computer.

For example, the output voltage (Vpout1) from the AC/DC converter in the above-described first to third exemplary embodiments is supplied to a drive motor serving as an image forming driving unit of the image forming apparatus, and the output voltage (Vout2) from the DC/DC converter is supplied to a control unit including a CPU. Here, examples of the drive motor of the image forming apparatus include a drive motor for a conveyance roller that conveys recording sheets, and a motor that drives the image forming driving unit.

Such an image forming apparatus has a power saving mode for reducing power consumption during a standby state when image formation is not performed, in addition to an operation mode for forming images. In the power saving mode, the switching power supply can be shifted to the power saving mode as described above by turning off the power supplied to the drive motor. In other words, the switching power supply is shifted to a state in which power is supplied only to the control unit. Thereby, in the power saving mode of the image forming apparatus, an operation in the power saving mode can be reliably performed with the switching power supply having an inexpensive configuration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-070181 filed Mar. 23, 2009, which is hereby incorporated by reference herein in its entirety.

What is claimed is:

1. A converter comprising:
a field-effect transistor (FET) configured to switch continually an input voltage;
a drive unit configured to drive the switching element, the drive unit including a transistor;
a pulse signal generating unit configured to supply a pulse signal to the drive unit, wherein the transistor is connected to the switching element, and the transistor is turned on and off according to the pulse signal so that the switching element continually switches the input voltage in a case where the input voltage is a first voltage, said pulse signal generating unit including a transistor; and a bypass unit configured to connect the switching element and the pulse signal generating unit without the transistor of the drive unit, said bypass unit including a resistor, wherein the resistor connects a base terminal of the FET and the transistor, and wherein the bypass unit stops an operation of the transistor and constantly maintains the switching element in an ON state in a case where the input voltage is switched to a second voltage lower than the first voltage.

2. The converter according to claim 1, wherein the switching element includes a field-effect transistor (FET), and said bypass unit includes a resistor, wherein the resistor is configured to connect a gate terminal of the FET and the pulse signal generating unit without involving the drive unit.

3. The converter according to claim 1, wherein the drive unit includes a circuit including an NPN transistor and a diode or a circuit including a PNP transistor and a diode.

4. The converter according to claim 1, wherein the drive unit includes a push-pull circuit that is a combination of an NPN transistor and a PNP transistor.

5. The converter according to claim 1, wherein the bypass unit includes a resistor.

6. A power supply comprising:

a first converter configured to convert a voltage to output a first voltage; and a second converter configured to convert the first voltage to output a second voltage, wherein the second converter includes:

a field-effect transistor (FET) configured to switch continually the first voltage;

a drive unit configured to drive the switching element, the drive unit including a transistor;

a pulse signal generating unit configured to supply a pulse signal to the drive unit, wherein the transistor is connected to the switching element, and the transistor is turned on and off according to the pulse signal so that the switching element continually switches the input voltage in a case where the input voltage is a first voltage, the pulse signal generating unit including a transistor; and a bypass unit configured to connect the switching element and the pulse signal generating unit without the transistor of the drive unit, said bypass unit including a resistor, wherein the resistor connects a base terminal of the FET and transistor, and wherein the bypass unit stops an operation of the transistor and constantly maintains the switching element in an ON state in a case where the first voltage is switched to a second voltage lower than the first voltage in order to shift to a power saving mode.

7. The power supply according to claim 6, wherein the switching element includes a field-effect transistor (FET), and said bypass unit includes a resistor, wherein the resistor is configured to connect a gate terminal of the FET and the pulse signal generating unit without involving the drive unit.

8. The power supply according to claim 6, wherein the drive unit includes a circuit including an NPN transistor and a diode or a circuit including a PNP transistor and a diode.

9. The power supply according to claim 6, wherein the drive unit includes a push-pull circuit that is a combination of an NPN transistor and a PNP transistor.

10. The power supply according to claim 6, wherein the bypass unit includes a resistor.

11. An image forming apparatus configured to form an image on a recording material, the image forming apparatus comprising:

an image forming driving unit;

a control unit configured to control the image forming driving unit; and a power supply configured to supply a voltage to the image forming driving unit and the control unit, wherein the power supply comprises:

a first converter configured to convert a voltage to output a first voltage; and a second converter configured to convert the first voltage to output a second voltage, wherein the second converter includes:

a field-effect transistor (FET) configured to switch continually the first voltage;

a drive unit configured to drive the switching element, the drive unit including a transistor;

a pulse signal generating unit configured to supply a pulse signal to the drive unit, wherein the transistor is connected to the switching element, and the transistor is turned on and off according to the pulse signal so that the switching element continually switches the input voltage in a case where the input voltage is a first voltage, the pulse signal generating unit including a transistor; and a bypass unit configured to connect the switching element and the pulse signal generating unit without the transistor of the drive unit, said bypass unit including a resistor, wherein the resistor connects a base terminal of the FET and transistor, and wherein the bypass unit stops an operation of the transistor and constantly maintains the switching element in an ON state in a case where the first voltage is switched to a second voltage lower than the first voltage in order to shift to a power saving mode.

* * * * *